(12) United States Patent
Heise et al.

(10) Patent No.: US 11,285,938 B2
(45) Date of Patent: Mar. 29, 2022

(54) METHOD FOR CONTROLLING A VEHICLE ON A BEND AND ROLL STABILITY CONTROL SYSTEM

(71) Applicant: WABCO Europe BVBA, Brussels (BE)

(72) Inventors: Michael Heise, Hannover (DE); Tobias Munko, Hannover (DE); Klaus Plaehn, Seelze (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 346 days.

(21) Appl. No.: 16/479,606

(22) PCT Filed: Feb. 1, 2018

(86) PCT No.: PCT/EP2018/052549
§ 371 (c)(1),
(2) Date: Jul. 22, 2019

(87) PCT Pub. No.: WO2018/153636
PCT Pub. Date: Aug. 30, 2018

(65) Prior Publication Data
US 2021/0331664 A1 Oct. 28, 2021

(30) Foreign Application Priority Data
Feb. 22, 2017 (DE) .................... 10 2017 001 709.3

(51) Int. Cl.
*B60W 30/04* (2006.01)
*B60T 8/24* (2006.01)
*B60W 50/00* (2006.01)

(52) U.S. Cl.
CPC ............. *B60W 30/04* (2013.01); *B60T 8/243* (2013.01); *B60W 50/0097* (2013.01);
(Continued)

(58) Field of Classification Search
CPC ...... B60W 30/00; B60W 30/02; B60W 30/04; B60W 50/00; B60W 50/0097;
(Continued)

(56) References Cited

U.S. PATENT DOCUMENTS

| 8,489,287 B2 | 7/2013 | Hsu et al. |
| 9,116,784 B2 | 8/2015 | Yao et al. |

(Continued)

FOREIGN PATENT DOCUMENTS

| DE | 19830189 A1 | 11/1999 |
| DE | 19848236 A1 | 4/2000 |

(Continued)

*Primary Examiner* — Geepy Pe
*Assistant Examiner* — Michael Allen Brace, Jr.
(74) *Attorney, Agent, or Firm* — Leydig, Voit & Mayer, Ltd.

(57) ABSTRACT

A method for controlling a vehicle when driving on a bend, includes determining bend information, wherein the bend information characterizes a further course of the bend in a direction of travel after a current position of the vehicle, determining predicted lateral acceleration values based on the bend information, wherein each of the predicted lateral acceleration values indicates a lateral acceleration predicted to act on the vehicle at a respective one of a plurality of future positions over the further course of the bend, and determining the probability of overturning at the future positions based on the predicted lateral acceleration values by comparing the predicted lateral acceleration values with a lateral acceleration limit value. A roll stability control (Continued)

system outputs a reduced deceleration request if the predicted lateral acceleration values undershoot the lateral acceleration limit value at least in certain regions.

8 Claims, 2 Drawing Sheets

(52) U.S. Cl.
CPC ... *B60W 2030/043* (2013.01); *B60W 2300/12* (2013.01); *B60W 2420/42* (2013.01); *B60W 2420/52* (2013.01); *B60W 2520/06* (2013.01); *B60W 2520/125* (2013.01); *B60W 2520/14* (2013.01); *B60W 2520/18* (2013.01); *B60W 2520/28* (2013.01); *B60W 2552/30* (2020.02); *B60W 2720/106* (2013.01)

(58) Field of Classification Search
CPC ......... B60W 2552/00; B60W 2552/30; B60W 2030/043; B60W 2300/00; B60W 2300/12; B60W 2420/00; B60W 2420/42; B60W 2420/52; B60W 2502/00; B60W 2502/06; B60W 2502/12; B60W 2502/125; B60W 2502/14; B60W 2502/18; B60W 2502/28; B60W 2720/00; B60W 2720/10; B60W 2720/106
See application file for complete search history.

(56) References Cited

U.S. PATENT DOCUMENTS

| | | | |
|---|---|---|---|
| 2002/0082749 A1* | 6/2002 | Meyers | B60T 8/243 701/1 |
| 2002/0145333 A1* | 10/2002 | Faye | B60T 8/246 303/140 |
| 2005/0085985 A1 | 4/2005 | Suzuki et al. | |
| 2005/0102083 A1* | 5/2005 | Xu | B60R 21/0132 701/70 |
| 2006/0074534 A1* | 4/2006 | Geborek | B60R 21/0132 701/38 |
| 2007/0008090 A1 | 1/2007 | Gertsch et al. | |
| 2007/0150157 A1* | 6/2007 | Lee | B60K 31/0066 701/93 |
| 2008/0133101 A1* | 6/2008 | Woywod | B60T 8/17554 701/83 |
| 2014/0081542 A1* | 3/2014 | Yao | B60W 40/076 701/70 |
| 2014/0222272 A1* | 8/2014 | Raste | B60T 8/1755 701/22 |

FOREIGN PATENT DOCUMENTS

| | | |
|---|---|---|
| DE | 29624641 U1 | 6/2006 |
| DE | 102006023265 A1 | 11/2007 |
| GB | 2343016 A | 4/2000 |

* cited by examiner

METHOD FOR CONTROLLING A VEHICLE ON A BEND AND ROLL STABILITY CONTROL SYSTEM

CROSS REFERENCE TO RELATED APPLICATIONS

This application is a U.S. National Stage Application under 35 U.S.C. § 371 of International Application No. PCT/EP2018/052549 filed on Feb. 1, 2018, and claims benefit to German Patent Application No. DE 10 2017 001 709.3 filed on Feb. 22, 2017. The International Application was published in German on Aug. 30, 2018, as WO 2018/153636 A1 under PCT Article 21(2).

FIELD

The invention relates to a method for controlling a vehicle, in particular a commercial vehicle, on a bend, and to a roll stability control system for carrying out the method.

BACKGROUND

Roll stability control systems in vehicles, in particular commercial vehicles, are used to prevent the vehicle from overturning by estimating, on the basis of currently captured driving dynamics parameters, whether a current lateral acceleration of the vehicle exceeds a lateral acceleration limit value. If this is the case, overturning of the vehicle is very likely. In order to counteract this overturning, the roll stability control system can determine a deceleration request and can output it to a braking system of the vehicle which implements this deceleration request. In this case, the deceleration request is stipulated in such a manner that the vehicle is decelerated to a vehicle speed at which the current lateral acceleration value falls below the lateral acceleration limit value again.

A disadvantage of many roll stability control systems is the fact that they can take into account only the current course of the bend or the current lateral acceleration at the current position of the vehicle since the deceleration request is set only on the basis thereof. However, no statement on the future course of the bend is possible on the basis of these driving dynamics parameters and the course of the bend can only be extrapolated for a short upcoming bend region of a few meters on the basis of the current driving situation.

A further development is described in U.S. Pat. No. 8,489,287 B2, according to which the future bend radius is estimated, in particular, on the basis of bend information captured by a camera. On the basis of this and taking into account a lateral acceleration limit value, a vehicle speed is then determined, for which overturning of the vehicle in the future course of the bend can be avoided. If it is determined that there is also a risk of overturning in future, the vehicle speed is reduced by actively braking the vehicle. Over the further course of the bend, the braking effect is reduced on the basis of the currently available driving dynamics parameters, that is to say the braking is possibly reduced or canceled if it is determined for the current position on the bend that overturning becomes more unlikely or the current lateral acceleration value is lower than the lateral acceleration limit value.

U.S. Pat. No. 9,116,784 B2 also shows such a roll stability control system in which a future probability of overturning is determined on the basis of driving dynamics information relating to the driver's own vehicle and on the basis of bend information determined in an anticipatory manner by means of a camera. If this probability becomes too high in future, braking intervention is carried out. The braking is canceled if it is determined for the current position on the bend that overturning becomes more unlikely or the current lateral acceleration value is lower than the lateral acceleration limit value.

SUMMARY

In an embodiment, the present invention provides a method for controlling a vehicle when driving on a bend, wherein the vehicle has a roll stability control system for determining a probability of overturning and for outputting a deceleration request based on the determined probability of overturning. The method includes determining bend information, wherein the bend information characterizes a further course of the bend in a direction of travel after a current position of the vehicle, determining predicted lateral acceleration values based on the bend information, wherein each of the predicted lateral acceleration values indicates a lateral acceleration predicted to act on the vehicle at a respective one of a plurality of future positions over the further course of the bend, and determining the probability of overturning at the future positions based on the predicted lateral acceleration values by comparing the predicted lateral acceleration values with a lateral acceleration limit value. The roll stability control system outputs a reduced deceleration request if the predicted lateral acceleration values undershoot the lateral acceleration limit value at least in certain regions. The reduced deceleration request is lower than a current deceleration request requested by the roll stability control system at the current position. For the reduced deceleration request, the predicted lateral acceleration values remain lower than the lateral acceleration limit value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
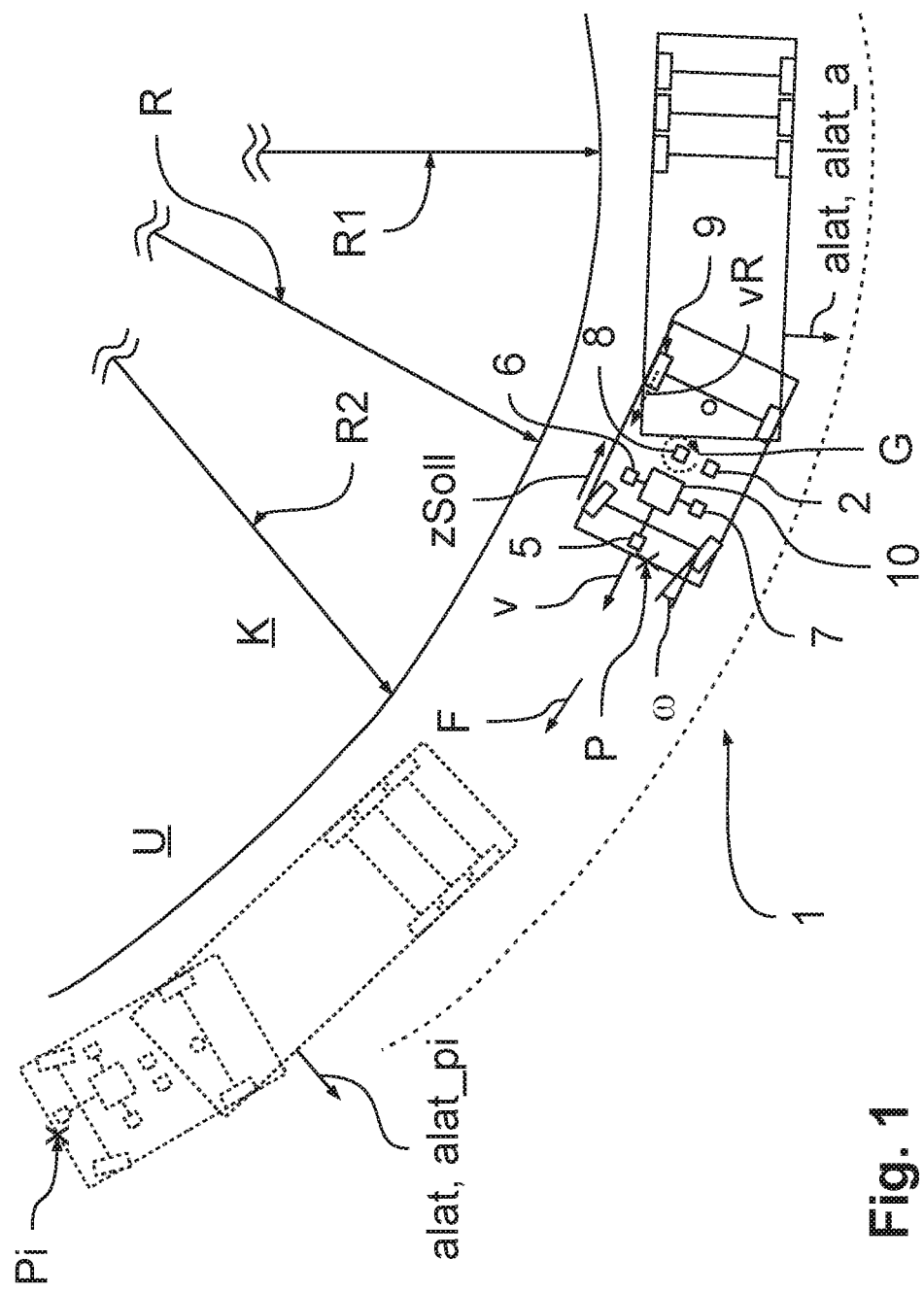
FIG. 1 provides a schematic view of a vehicle on a bend.

Over the further course of a bend, a situation may arise in which a bend radius increases again (after decreasing), that is to say the bend becomes wider over the course of the bend or follows a straight road section. In this case, however, known roll stability control systems will nevertheless output a deceleration request which is based on the driving dynamics parameters for the current position and on an extrapolation of the current driving situation. However, since the course of the bend continues differently than extrapolated, the deceleration request of this level is no longer necessary under certain circumstances. This has the disadvantage that the driver may become irritated since the driver actually does not expect any braking intervention or expects a lower braking intervention on account of the driver's view of the course of the bend. Undisturbed and safe drivability of the vehicle therefore cannot be ensured.

Embodiments of the invention provide a method for controlling a vehicle on a bend, which method can be used to ensure safe and reliable operation of the vehicle. Embodiments of the invention also provide a roll stability control system for carrying out such a method.

Embodiments of the invention provide for a current deceleration request requested by a roll stability control system at a current position to be reduced if lateral acceleration values predicted for the future course of the bend undershoot a lateral acceleration limit value at least in certain regions. The reduction is carried out in this case in such a manner that the roll stability control system outputs a reduced deceleration request for which, when implemented, the predicted lateral acceleration values still remain lower than the lateral acceleration limit value in order to also continue to avoid overturning during the reduction.

This already makes it possible to achieve the advantage that a deceleration request predefined or currently requested by the roll stability control system in a vehicle, in particular a commercial vehicle, can already be canceled or reduced in an anticipatory manner if it is determined that such a high deceleration request is no longer necessary in order to prevent the vehicle from overturning on a bend. This is the case, in particular, when a bend radius increases over the further course of the bend, that is to say the bend becomes wider or changes to a straight road section. As a result, the acting lateral acceleration also becomes lower, which results in a lower probability of overturning. This is also perceived in this way by the driver since the driver expects, on the basis of his view of a vehicle environment, that a lasting braking process is actually no longer necessary on account of the upcoming widening course of the bend.

In this case, the predicted lateral acceleration is determined on the basis of bend information which characterizes the further course of the bend in a direction of travel after the current position of the vehicle, in which case it is taken into account, in particular, how the bend radius develops over the further course of the bend. The predicted lateral acceleration values can preferably be determined from the bend radius at the corresponding position taking into account a vehicle speed, which lateral acceleration values indicate what lateral acceleration will presumably act on the vehicle over the further course of the bend.

In this case, it is preferably also taken into account how the vehicle speed will develop over the further course of the bend, that is to say whether, for example, there is already a current deceleration request by the roll stability control system and/or a braking request by the driver or another driver assistance system, which influence(s) the vehicle speed and therefore also the predicted lateral acceleration over the further course of the bend. As a result, the determination of the predicted lateral acceleration becomes more accurate.

In this case, the bend information can preferably be provided using a sensor system in the vehicle, wherein the sensor system captures a vehicle environment and outputs sensor data to the roll stability control system on the basis thereof. The roll stability control system then uses the sensor data to determine, for example, the bend radius at the future positions on the bend, from which the predicted lateral acceleration in turn follows. As a result, the future course of the bend can be captured in a simple manner and can be processed by the roll stability control system in order to estimate a probability of overturning for the future course of the bend.

In this case, it is preferably possible to resort to systems, for example of a stability control system or of an emergency brake assistant, which are already present in the vehicle and have such a sensor system. A camera, a radar system or a LIDAR system can be used, for example.

Alternatively or additionally, in order to determine the bend information, it is also possible to resort to a map system in which maps with road courses are available, on the basis of which it is possible to determine, depending on the current position of the vehicle, how the bend will continue after the current position. If the sensor data are therefore not available or a fault occurs in the sensor system, it is possible to switch to a further system in order to also then still be able to estimate the probability of overturning with a high degree of accuracy. Using the map system, it is advantageously possible in this case to act in a more anticipatory manner than with the above-mentioned sensor system since the bend information is available long before entering the bend and the probability of overturning can already be determined in an anticipatory manner. However, this can also be ensured with a camera having a wide viewing angle, for example, using the sensor system in the vehicle. This possibility of the highly anticipatory determination makes it possible to reduce the deceleration request in addition to a braking intervention or instead of the latter by reducing the engine torque.

It is also advantageously possible to check the plausibility of the differently obtained bend information by comparing the bend information obtained from the sensor data with the bend information obtained from the map system.

The probability of overturning can be estimated by the roll stability control system after the predicted lateral acceleration values have been determined, which roll stability control system compares a current lateral acceleration which is present at the current position or is estimated for the current position and the predicted lateral acceleration values at future positions of the bend with the lateral acceleration limit value and specifies corresponding deceleration requests to a braking system of the vehicle in an automated manner on the basis thereof. It is therefore possible to react with an increase or a reduction in the braking intervention both on the basis of the current driving situation and on the basis of the predicted driving situation.

In this case, the current lateral acceleration may be determined or estimated by a lateral acceleration sensor in the vehicle, preferably at the center of gravity, and/or from a steering angle taking into account a vehicle speed and/or from a yaw rate measured by a yaw rate sensor taking into account the vehicle speed and/or from wheel speeds measured at the individual wheels of the vehicle. Furthermore, signal dynamics, that is to say a gradient of the accordingly measured variables, can also be concomitantly included in order to be able to estimate the development of the current lateral acceleration. As a result, it is easily possible to resort to a current lateral acceleration or to lateral acceleration estimated for the current position.

FIG. 1 shows, by way of example, as a vehicle 1, a commercial vehicle combination which is driving through a bend K with a bend radius R. In the region of the vehicle 1 up to its current position P—for example the front side of the vehicle 1—the shown section of the bend K has a first value R1 for the bend radius R and, approximately between the current position P of the vehicle 1 and the end of the section, has a second value R2 for the bend radius R, which is somewhat greater than the first value R1. The bend radius R of the bend K therefore increases over the further course of the bend K along a direction of travel F of the vehicle 1 or the bend K becomes wider. A roll stability control system 10 is provided in the vehicle 1 for the purpose of stabilizing the vehicle 1 on this bend.

On the basis of current driving dynamics parameters, in particular a currently measured or calculated or estimated lateral acceleration value alat_a for the vehicle 1, and on the basis of lateral acceleration values alat_pi predicted for the future course of the bend K, the roll stability control system 10 determines how high a probability W of overturning of the vehicle 1 is in the current driving situation and how this probability W of overturning will presumably develop over the further course of the bend. In order to assess the probability of overturning W at the current position P or at future positions Pi on the bend K, the current lateral acceleration value alat_a for the current position P or the predicted lateral acceleration values alat_pi for the respective future positions Pi is/are compared with a lateral acceleration limit value alat_th. That is to say, a lateral acceleration alat acting on the vehicle 1 is monitored for the current driving situation and for the future driving situation.

If the lateral acceleration limit value alat_th is exceeded, that is to say there is a high probability of overturning W at the respective position P, Pi, the reaction is a request for braking or a specification of a corresponding deceleration request zSoll, zSoll_r for adapting a vehicle speed v, which is implemented by the braking system of the vehicle 1. In this case, the adaptation is carried out dynamically and in such a manner that the lateral acceleration limit value alat_th is not exceeded at any position P, Pi while driving through the bend K, wherein an appropriate reaction is given for the current position P on the basis of the current lateral acceleration value alat_a estimated at the current position P and in an anticipatory manner for the future positions Pi on the basis of the predicted lateral acceleration values alat_pi, and the driving dynamics of the vehicle 1 are therefore also adapted in an anticipatory manner with regard to preventing overturning.

The predicted lateral acceleration values alat_pi are determined from captured bend information, wherein the bend information indicates, in particular, information relating to the course of the bend K in the direction of travel F after the current position P of the vehicle 1. Sensor data S from a sensor system 5 in the vehicle 1 can be used, for example, by the roll stability control system 10 to capture this bend information. The sensor system 5 may have, for example, a camera 5a and/or a radar system 5b and/or a LIDAR system 5c which capture a vehicle environment U around the driver's own vehicle 1 and output corresponding sensor data S.

Such a sensor system 5 is already present in vehicles 1 with an emergency brake assistant (advanced emergency braking system, AEBS), for example, or other stability control systems and therefore no longer needs to be retrofitted. The sensor data S provided by the sensor system 5 can be transmitted to the roll stability control system 10 via a CAN bus or the like, for example. The roll stability control system 10 can then determine, on the basis of these sensor data S, how the bend K will develop over the further course at the individual positions Pi, that is to say how high the bend radius R will be over the further course of the bend K, for example, and whether it will become greater or smaller or will remain the same.

On the basis of the determined bend radii R at the future positions Pi and, in particular, the vehicle speed v, the lateral acceleration values alat_pi can then be predicted for the further course of the bend K. In this case, it is also taken into account whether the current driving dynamics of the vehicle 1 will change on the bend K, that is to say how high the vehicle speed v, for example, will be over the further course of the bend K taking into account a current deceleration request zSoll possibly requested by the roll stability control system 10 at the current position P, in which case a braking request from the driver or else from other driving assistance systems in the vehicle 1 can also be taken into account.

Additionally or alternatively, it is also possible to resort to data from a map system 6 in order to capture the bend information. For this purpose, the current position P of the vehicle 1 is first of all determined using a position determination system 7 in the vehicle 1, for example GPS, GLONASS or the like, and is compared with maps available in the map system 6 in order to determine how the bend K continues from the current position P. On the basis of this information, the roll stability control system 10 may likewise determine a course of the bend radius R and, on the basis thereof, predicted lateral acceleration values alat_pi, as described above.

The plausibility of the sensor data from the sensor system 5 and the information obtained from the map system 6 can additionally also be checked, for example in the event of faulty reception by the position determination system 7 or in the event of faults when capturing the vehicle environment U by means of the sensor system 5.

The current lateral acceleration value alat_a can be directly measured, for example, by a lateral acceleration sensor 2 in the vehicle 1, which sensor is already present, for example, in a vehicle 1 with a stability control system. However, it is also possible to estimate the current lateral acceleration value alat_a on the basis of a currently measured steering angle ω and the currently measured vehicle speed v, wherein the current bend radius R follows from the current steering angle ω and the current lateral acceleration alat_a follows therefrom using $alat\_a = v^2/R$. In this case, it is assumed that a particular current lateral acceleration value alat_a will be established after a certain time for the current available steering angle ω and with the available driving dynamics. In contrast to a measurement using the lateral acceleration sensor 2, the current lateral acceleration value alat_a which is established with some delay in response to a steering request can therefore already be estimated in an anticipatory manner. Furthermore, the current lateral acceleration value alat_a can also be determined from a yaw rate G measured by a yaw rate sensor 8, for example, and the currently measured vehicle speed v or from wheel speeds vR measured at wheels 9 of the vehicle 1.

By additionally including the bend information, the roll stability control system 10 can therefore estimate, in an anticipatory manner, the development of the lateral acceleration values alat_a, alat_pi and therefore also the developing probability of overturning W and can use this to determine whether or not it is actually still useful to reduce the vehicle speed v according to the current deceleration request zSoll, that is to say whether or not a current deceleration request zSoll possibly predefined by the roll stability control system 10 should be retained.

Therefore, in the driving situation according to FIG. 1, at the current position P of the vehicle 1, it can be discerned, on the basis of the bend information determined using the sensor system 5 and/or using the map system 6, that the bend K becomes wider over the further course. The probability W of overturning which is determined on the basis of the current driving dynamics information and the current lateral acceleration value alat_a, in the case of braking with the current deceleration request zSoll at the current position P, is therefore no longer relevant to the course of the bend K following in the direction of travel F since it can be assumed that the current lateral acceleration value alat_a will become smaller in future by reducing the steering angle ω even if the vehicle speed v remains the same. Consequently, the current deceleration request zSoll predefined by the roll stability control system 10 at the current position P can also be reduced or possibly even entirely canceled by specifying a deceleration request zSoll_r which is reduced in comparison, if this does not result in the lateral acceleration limit value alat_th being exceeded.

The current deceleration request zSoll is therefore canceled or reduced on the basis of the bend information determined in an anticipatory manner, rather than on the basis of the driving dynamics information for the current position. The current deceleration request zSoll can therefore already be reduced or canceled at an earlier time and therefore also in a gentler manner since the reaction is not abruptly given only when the change in the bend radius R can be determined using a changing steering angle ω or a corresponding development in the current lateral acceleration value alat_a but rather already in an anticipatory manner. As a result, the driver is not irritated by unnecessary braking interventions since the reaction of the vehicle 1 matches the vehicle environment U observed by the driver, that is to say a cancellation or reduction of the current deceleration request zSoll in response to a course of the bend which becomes wider again.

Figure 2:
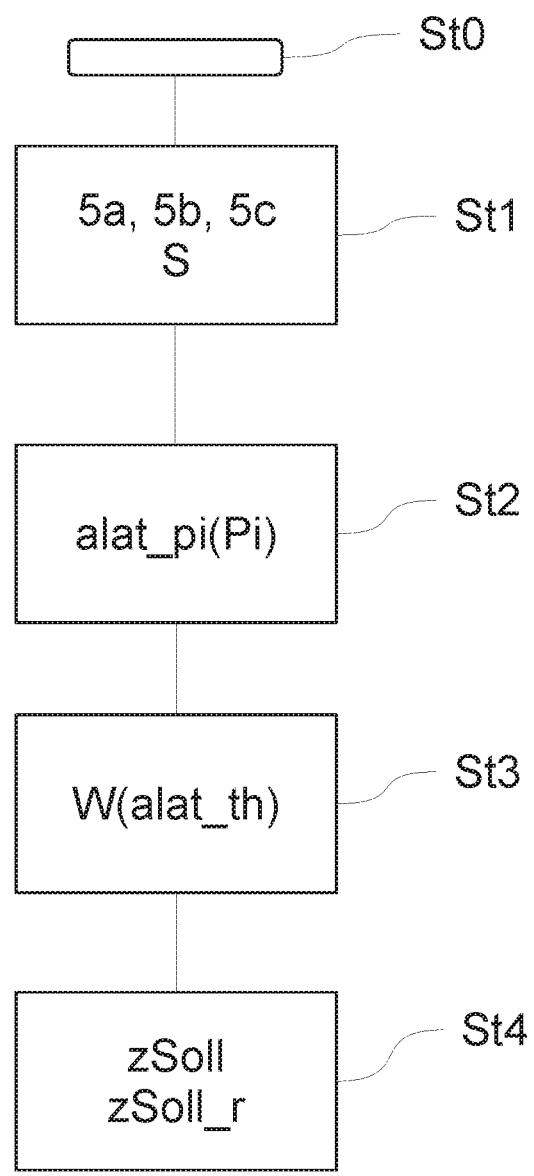
FIG. 2 provides a flowchart of a method according to an embodiment of the invention.

The method according to the invention can take place as follows according to FIG. 2, for example. In an initial step St0, the roll stability control system 10 is initialized, for example when driving commences.

In a first step St1, the future course of the bend, in particular the bend radius R at the future positions Pi, is determined on the basis of bend information determined using the sensor system 5, for example the camera 5a and/or the radar system 5b and/or the LIDAR system 5c. For this purpose, the sensor system 5 transmits the sensor data S to the roll stability control system 10.

In a second step St2, predicted lateral acceleration values alat_pi are determined from the bend information, as described above, wherein the predicted lateral acceleration values alat_pi each indicate a lateral acceleration alat presumably acting on the vehicle 1 at the corresponding future position Pi on the bend K.

These predicted lateral acceleration values alat_pi are compared with the lateral acceleration limit value alat_th in a third step St3 in order to estimate a probability of overturning W at the future positions Pi. If this lateral acceleration limit value alat_th for the future course of the bend is undershot at least in certain regions, a current deceleration request zSoll requested by the roll stability control system 10 at the current position P is reduced, in a fourth step St4, to a reduced deceleration request zSoll_r for which the predicted lateral acceleration values alat_pi which already undershoot the lateral acceleration limit value alat_th still remain lower than the lateral acceleration limit value alat_th. If necessary, the current deceleration request zSoll requested at the current position P can also be completely canceled thereby, for example in the event of a transition to driving straight ahead.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Vehicle
2 Lateral acceleration sensor
5 Sensor system
5a Camera
5b Radar system
5c LIDAR system
6 Map system
7 Position determination system
8 Yaw rate sensor
9 Wheels of the vehicle 1
10 Roll stability control system
alat_a Current lateral acceleration value at the position P
alat_pi Predicted lateral acceleration values at the positions Pi
alat_th Lateral acceleration limit value
F Direction of travel
G Yaw rate
K Bend
P Current position
Pi Future positions
R Bend radius
R1 First value of the bend radius R
R2 Second value of the bend radius R
S Sensor data
U Vehicle environment
v Vehicle speed
vR Wheel speed
W Probability of overturning
ω Steering angle
zSoll Current deceleration request
zSoll_r Reduced deceleration request
St0, St1, St2, St3, St4 Steps of the method

The invention claimed is:

1. A method for controlling a vehicle when driving on a bend, wherein the vehicle has a roll stability control system for determining a probability of overturning and for outputting a deceleration request based on the probability of overturning, the method comprising:

determining bend information, wherein the bend information characterizes a further course of the bend in a direction of travel after a current position of the vehicle and is determined by a sensor system in the vehicle, wherein the sensor system captures a vehicle environment around the vehicle and outputs sensor data to the roll stability control system on a basis thereof;

determining predicted lateral acceleration values based on the bend information, wherein each of the predicted lateral acceleration values indicates a lateral acceleration predicted to act on the vehicle at a respective one of a plurality of future positions over the further course of the bend; and determining the probability of overturning at the future positions based on the predicted lateral acceleration values by comparing the predicted lateral acceleration values with a lateral acceleration limit value;

determining, by the roll stability control system, a bend radius at the future positions from the sensor data;

wherein the roll stability control system determines the predicted lateral acceleration values from the bend radius at the future positions, wherein a vehicle speed is additionally taken into account for this purpose, and outputs a reduced deceleration request if the predicted lateral acceleration values undershoot the lateral acceleration limit value at least in certain regions, wherein the reduced deceleration request is lower than a current deceleration request requested by the roll stability control system at the current position of the vehicle, and wherein, for the reduced deceleration request, the predicted lateral acceleration values remain lower than the lateral acceleration limit value.

2. The method as claimed in claim 1, wherein the current deceleration request is determined based on a lateral acceleration estimated at the current position of the vehicle and/or the predicted lateral acceleration values at the future positions on the bend.

3. The method as claimed in claim 2, wherein the lateral acceleration estimated at the current position of the vehicle is determined by a lateral acceleration sensor and/or from a steering angle taking into account a vehicle speed and/or from a yaw rate measured by a yaw rate sensor taking into account the vehicle speed and/or from wheel speeds measured at individual wheels of the vehicle.

4. The method as claimed in claim 1, wherein the bend information is determined from a map system based on the current position of the vehicle, and wherein the further course of the bend is stored in the map system.

5. The method as claimed in claim 1, wherein a portion of the bend information is determined from a map system based on the current position of the vehicle, and wherein a plausibility of a portion of the bend information which is not obtained by the map system is checked by the portion of the bend information which is obtained from the map system.

6. A roll stability control system for determining a probability of overturning of a vehicle when driving on a bend and for outputting a deceleration request based on the probability of overturning, configured to:

determine bend information, wherein the bend information characterizes a further course of the bend in a direction of travel after a current position of the vehicle and is determined by a sensor system in the vehicle, wherein the sensor system captures a vehicle environment around the vehicle and outputs sensor data to the roll stability control system on a basis thereof;

determine, by the roll stability control system, a bend radius at future positions of the bend from the sensor data;

determine predicted lateral acceleration values based on the bend information, wherein each of the predicted lateral acceleration values indicates a lateral acceleration predicted to act on the vehicle at a respective one of a plurality of future positions over the further course of the bend; and determine the probability of overturning at the future positions based on the predicted lateral acceleration values by comparing the predicted lateral acceleration values with a lateral acceleration limit value;

wherein the roll stability control system determines the predicted lateral acceleration values from the bend radius at the future positions of the bend, wherein a vehicle speed is additionally taken into account for this purpose, and outputs a reduced deceleration request if the predicted lateral acceleration values undershoot the lateral acceleration limit value at least in certain regions, wherein the reduced deceleration request is lower than a current deceleration request requested by the roll stability control system at the current position of the vehicle, and wherein, for the reduced deceleration request, the predicted lateral acceleration values remain lower than the lateral acceleration limit value.

7. The roll stability control system of claim 6, wherein the vehicle comprises a sensor system, the sensor system including one or more of a camera, a radar system, and a LIDAR system.

8. A method for controlling a vehicle when driving on a bend, wherein the vehicle has a roll stability control system for determining a probability of overturning and for outputting a deceleration request based on the probability of overturning, the method comprising:

determining bend information, wherein the bend information characterizes a further course of the bend in a direction of travel after a current position of the vehicle and is determined by a sensor system in the vehicle, wherein the sensor system captures a vehicle environment around the vehicle and outputs sensor data to the roll stability control system on a basis thereof;

determining, by the roll stability control system, a bend radius at future positions of the bend from the sensor data;

determining predicted lateral acceleration values based on the bend information, wherein each of the predicted lateral acceleration values indicates a lateral acceleration predicted to act on the vehicle at a respective one of a plurality of future positions over the further course of the bend; and determining the probability of overturning at the future positions based on the predicted lateral acceleration values by comparing the predicted lateral acceleration values with a lateral acceleration limit value;

wherein the roll stability control system determines the predicted lateral acceleration valves from the bend radius at the future positions of the bend and outputs a reduced deceleration request if the predicted lateral acceleration values undershoot the lateral acceleration limit value at least in certain regions, wherein a vehicle speed and current deceleration request requested at the current position of the vehicle is additionally used to determine the predicted lateral acceleration values, wherein a change in the vehicle speed at the future positions of the bend is determined from the current deceleration request, and wherein the reduced deceleration request is lower than the current deceleration request requested by the roll stability control system at the current position of the vehicle, and wherein, for the reduced deceleration request, the predicted lateral acceleration values remain lower than the lateral acceleration limit value.

* * * * *